United States Patent
Chou et al.

(10) Patent No.: US 9,082,332 B2
(45) Date of Patent: Jul. 14, 2015

(54) MODE DETECTING CIRCUIT AND METHOD THEREOF

(75) Inventors: Yu-Pin Chou, Miao Li County (TW); Szu-Ping Chen, Chu Pei (TW); Yu Jen Lin, I Lan County (TW)

(73) Assignee: Realtek Semiconductor Corp., Hsinchu (TW)

( * ) Notice: Subject to any disclaimer, the term of this patent is extended or adjusted under 35 U.S.C. 154(b) by 1432 days.

(21) Appl. No.: 12/128,372

(22) Filed: May 28, 2008

(65) Prior Publication Data

US 2008/0297511 A1    Dec. 4, 2008

Related U.S. Application Data (60) Provisional application No. 60/940,445, filed on May 28, 2007.

(51) Int. Cl.
*G09G 5/02*     (2006.01)
*G09G 5/00*     (2006.01)

(52) U.S. Cl.
CPC .......... *G09G 5/005* (2013.01); *G09G 2340/0414* (2013.01); *G09G 2340/0421* (2013.01)

(58) Field of Classification Search
CPC ................ G09G 5/005; G09G 5/006; G09G 2340/0407; G09G 2340/0414; G09G 2340/0421
USPC ............... 345/3.2–3.4, 428, 698–699, 204
See application file for complete search history.

(56) References Cited

U.S. PATENT DOCUMENTS

| | | | | |
|---|---|---|---|---|
| 4,876,602 A | * | 10/1989 | Zwirn et al. | 348/625 |
| 6,348,931 B1 | * | 2/2002 | Suga et al. | 345/699 |
| 6,577,322 B1 | * | 6/2003 | Fukuda | 345/698 |
| 2003/0156639 A1 | * | 8/2003 | Liang | 375/240.01 |
| 2004/0085283 A1 | * | 5/2004 | Wang | 345/100 |

FOREIGN PATENT DOCUMENTS

| | | |
|---|---|---|
| CN | 1858843 | 11/2006 |
| TW | 200404456 | 3/2004 |

* cited by examiner

*Primary Examiner* — William Boddie
*Assistant Examiner* — Saifeldin Elnafia
(74) *Attorney, Agent, or Firm* — Muncy, Geissler, Olds & Lowe, P.C.

(57) ABSTRACT

The invention discloses a mode detection circuit and a method thereof, for detecting an image signal, the image signal includes a horizontal resolution and the vertical resolution. The mode detection circuit includes a measuring unit, a calculation unit, and a decision unit. The measuring unit receives a clock signal and is used to count the clock signal to output a first counting value and the second counting value. The calculation unit is used to perform the calculation with the first counting value and the second counting value and thereby outputting a calculating value, wherein the calculating value outputted by the calculation unit is corresponding to the ratio of the first counting value to the second counting value. The decision unit is used to determine the horizontal resolution or the vertical resolution according to the calculating value.

8 Claims, 8 Drawing Sheets

| Look Up Table | |
|---|---|
| COUNT | MODE |
| 31700 | 640 x 480 |
| 39625 | 800 x 600 |
| 50720 | 1040 x 768 |
| 63400 | 1280 x 1024 |

MODE DETECTING CIRCUIT AND METHOD THEREOF

This application is a Non-Provisional of Application No. 60/940,445, filed on May 28, 2007, and for which priority is claimed under 35 U.S.C. §119; the entire contents of all are hereby incorporated by reference.

BACKGROUND OF THE INVENTION (a) Field of the Invention

The invention relates to display technology, particularly to a mode detection circuit and a method thereof.

(b) Description of the Related Art

At present, a digital display, such as: liquid crystal display (LCD), plasma display panel (PDP), has gradually become the mainstream product in the market. In general, each of the digital display panels has a fixed physical resolution. For example, a display panel can display up to 1024×768 pixels according to the actual designed structure. Furthermore, the resolution of an image signal outputted by a general video signal source, such as personal computer (PC), digital video disc/disk player (DVD Player), and so forth, may not be exactly equal to the fixed resolution of the display panel. In other words, if a receiving circuit is applied in a liquid crystal display panel having a resolution of 1280×1024, then the receiving circuit has to perform scaling up operation on the 640×480, 800×600, or 1024×768 image signal to match the fixed resolution of the display panel.

BRIEF SUMMARY OF THE INVENTION

In light of above mentioned problems, an object of the invention is to provide a mode detection circuit and a method thereof. The detection circuit and the method thereof can automatically detect the resolution of an image when an image signal is inputted and can be adjusted, such as scaling up or scaling down, the resolution of the input image when the resolution of the input image is not equal to the fixed resolution of the display device so that the adjusted input image resolution is equal to the fixed resolution of the flat panel display device. Then, correctly displaying the image on the display device can be achieved.

One embodiment of the invention provides a mode detection circuit applicable to a display device. The circuit comprises a front end circuit, a back end circuit, and a determining unit. The front end circuit is used to measure an image signal and determine the mode of the image signal according to the image signal data so as to fetch the image data of the image signal. The back end circuit processes the image data according to the above-mentioned mode and generates a feedback signal according to the status of the image data after fetching. The determining unit generates a control signal to the front end circuit to adjust the setting of the mode according to the feedback signal.

Another embodiment of the invention provides a mode detection circuit applicable to a display device. The circuit detects an image signal and the image signal comprises a horizontal resolution and a vertical resolution. The mode detection circuit comprises: a measuring unit receiving a clock signal for counting the clock signal to output a first counting value and a second counting value; a calculation unit, coupled to the measuring unit, for performing calculation with the first counting value and the second value and outputting a calculating value; and a decision unit, coupled to the calculation unit, for determining the horizontal resolution or the vertical resolution according to the calculating value. The calculating value outputted by the calculation unit is corresponding to the ratio of the first counting value to the second counting value.

The mode detection circuit and the method thereof according to embodiments of the invention can detect, automatically and correctly, the resolution of the image signal when the image signal is inputted. Therefore, the problems in the prior art can be solved.

DETAILED DESCRIPTION OF THE INVENTION

Generally, the image signals outputted from various video signal sources are generated according to a specific specification and each image according to a specific specification has a specific resolution. In order to facilitate the receiving circuit of the flat panel display device to detect the resolution of the image signal when the image signal is inputted, it is necessary to perform auto mode detection on the image signal.

The format of the image signal further comprises other control signals besides the image data. For example, a general image signal further comprises data, such as horizontal synchronizing signal HS, vertical synchronizing signal VS, data enable signal DEN, and so forth. Therefore, when performing the auto mode detection according to one embodiment of the invention, a measuring method can be used to obtain the relevant parameters of the input image signal and thus which supporting mode (what kind of resolution) that the input image signal belongs to can be known or determined. The measuring method can measure the frequency, the period, the bandwidth, or the polarity of the synchronizing signal HS or VS; or the total baseband clock CK counts used by the overall synchronizing signal.

It should be noted that, in the following description, the embodiments of the invention is based on the flat panel display device, but with minor modifications, the technology of the invention is also applicable to various other display devices, such as non-planar display device, various possible forms of digital or analog display devices to be developed in future, or can even be applied in the display devices with variable physical resolution that may be developed in the future, without deviating from what is claimed for the invention.

Figure 1:
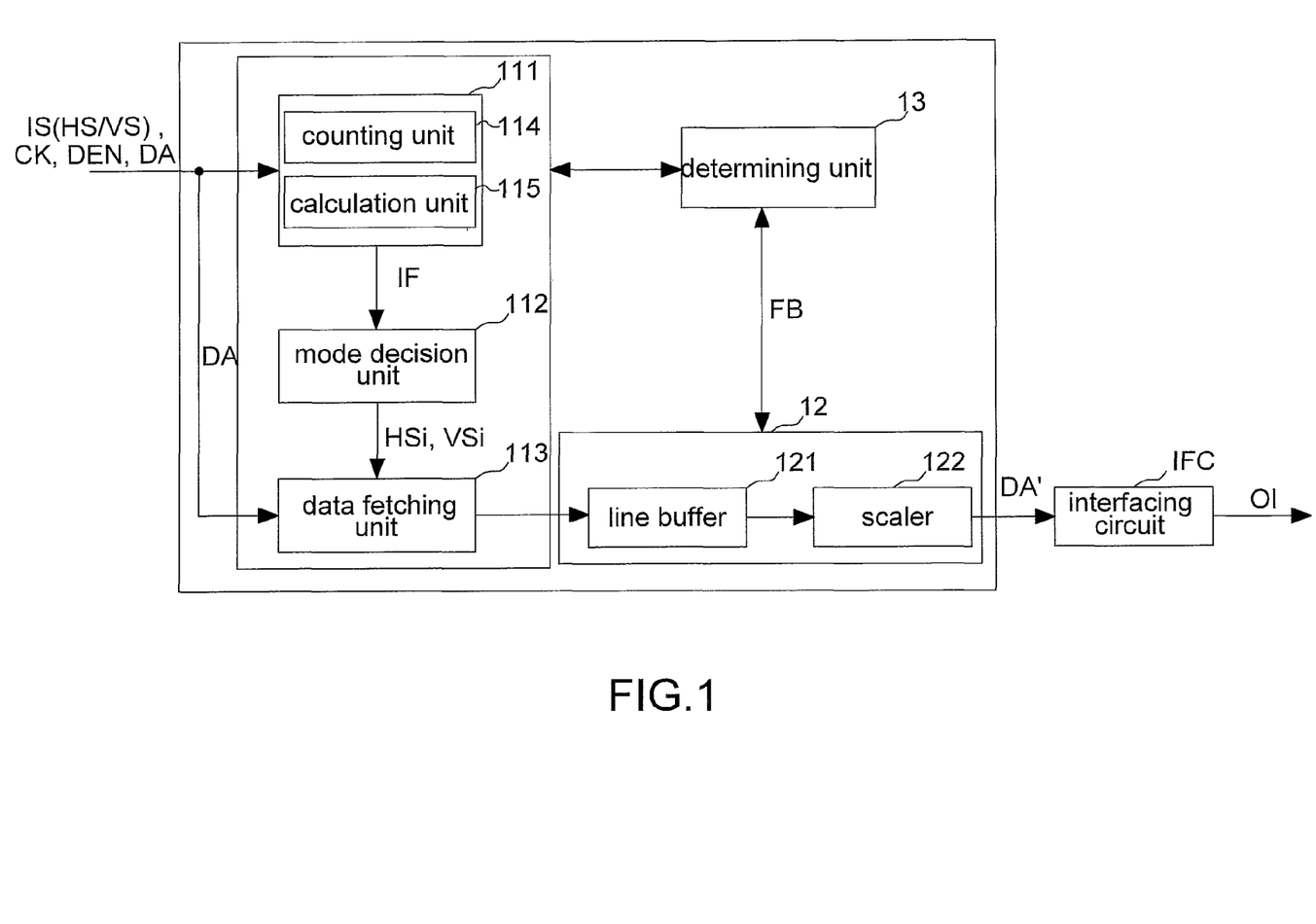
FIG. 1 shows a schematic diagram illustrating the mode detection circuit according to one embodiment of the invention.

FIG. 1 shows a mode detection circuit 10 and an interfacing circuit IFC that is coupled to the flat panel display device according to one embodiment of the invention. The circuit 10 is applicable to and installed in the flat panel display device as the receiving circuit of the flat panel display device. The mode detection circuit 10 is for detecting the resolution of a video image signal IS outputted from the video signal source. The image signal IS can be a digital signal or an analog signal. As it is a digital signal, the image signal IS comprises a horizontal synchronizing signal HS, a vertical synchronizing signal VS, a clock signal CK, a data enable signal DEN, and image data DA. As it is an analog signal, the image signal IS comprises a horizontal synchronizing signal HS, a vertical synchronizing signal VS, a clock signal CK, and image data DA.

The mode detection circuit 10 comprises a front end circuit 11, a back end circuit 12, and a determining unit 13. The front end circuit 11 receives and measures the image signal IS, and determines if the image signal IS belongs to one of the supported modes according to the measured data (the data provided by the image signal IS). If the image signal belongs to one of the supported modes, then the front end circuit determines the mode of the image signal IS and fetches the image data DA of the image signal IS according to the setting of the mode. If the image signal is not supported, then the front end circuit outputs an alerting signal (not shown in the figure) to indicate that the image signal IS belongs to an un-supported mode. Furthermore, the front end circuit 11 can also reselect the proper mode or adjusts the vertical resolution or the horizontal resolution of the current mode according to a control signal DT.

In one embodiment of the invention, the front end circuit 11 comprises a measuring unit 111, a mode decision unit 112, and a data fetching unit 113. The measuring unit 111 measures and calculates on the image signal to derive the relevant data IF (frequency, period, bandwidth, timing or polarity, and so forth) provided by the horizontal synchronizing signal HS, the vertical synchronizing signal VS, the clock signal CK, a data enable signal DEN or the image data DA, by way of a counting unlit 114 and a calculation unit 115. The mode decision unit 112 determines which mode the image signal belongs to according to the comparison result between the relevant data IF and a plurality of pre-determined reference values RV. The pre-determined reference value RV can be provided by a look-up-table that is built-in or externally coupled to the mode decision unit 112, or provided by a hardware circuit. Thereafter, the mode decision unit 112 generates a corresponding virtual (output) horizontal synchronizing signal HSi and a corresponding virtual (output) vertical synchronizing signal VSi according to the image resolution pre-determined by the current mode. Then, the data fetching unit 113 fetches the image data DA according to the virtual (output) horizontal synchronizing signal HSi and the virtual (output) vertical synchronizing signal VSi.

The back end circuit 12 receives and temporarily stores the image data DA, sets the image data DA by properly scaling and adjusting the image data DA according to the current mode, and Outputs the adjusted image data DA' to the flat panel display device via the interfacing circuit IFC, so that the setting of resolution or the like of the image data DA matches the fixed resolution of the flat panel display device. On the other hand, the back end circuit 12 generates a feedback signal FB at the same time while adjusting the image data DA, according to whether the actual status of the image data DA is normal or not, or according to whether the status of the image data DA is normal or not after being fetched by the front end circuit 11, or according to whether the image data DA' is normal data or not after being set by the back end circuit 12.

According to one embodiment of the invention, the back end circuit 12 comprises a line buffer 121 and a scalar 122. The line buffer 121 temporarily stores a part of the image data DA, which is the pixel data of the active area portion of the image data DA or the pixel data needed for the scaling process. The scalar 122 is for scaling and adjusting the image data DA according to the scaling factor. The scaling factor is the ratio of the resolution determined in the current mode to the fixed resolution of the flat panel display device.

The determining unit 13 receives the feedback signal FB, and generates a control signal DT to the front end circuit 11 according to the data provided by the feedback signal FB (such as the result of determining if the image data DA' can be correctly displayed or if underflow or overflow phenomenon occurs in the data amount of the line buffer 121) to adjust the setting of the current mode or to select another suitable mode. According to one embodiment of the invention, the control signal DT is inputted to the mode decision unit 112 for assigning one of the pre-determined modes as the current mode or for changing the setting of the vertical or horizontal resolution of the current mode.

Figure 2:
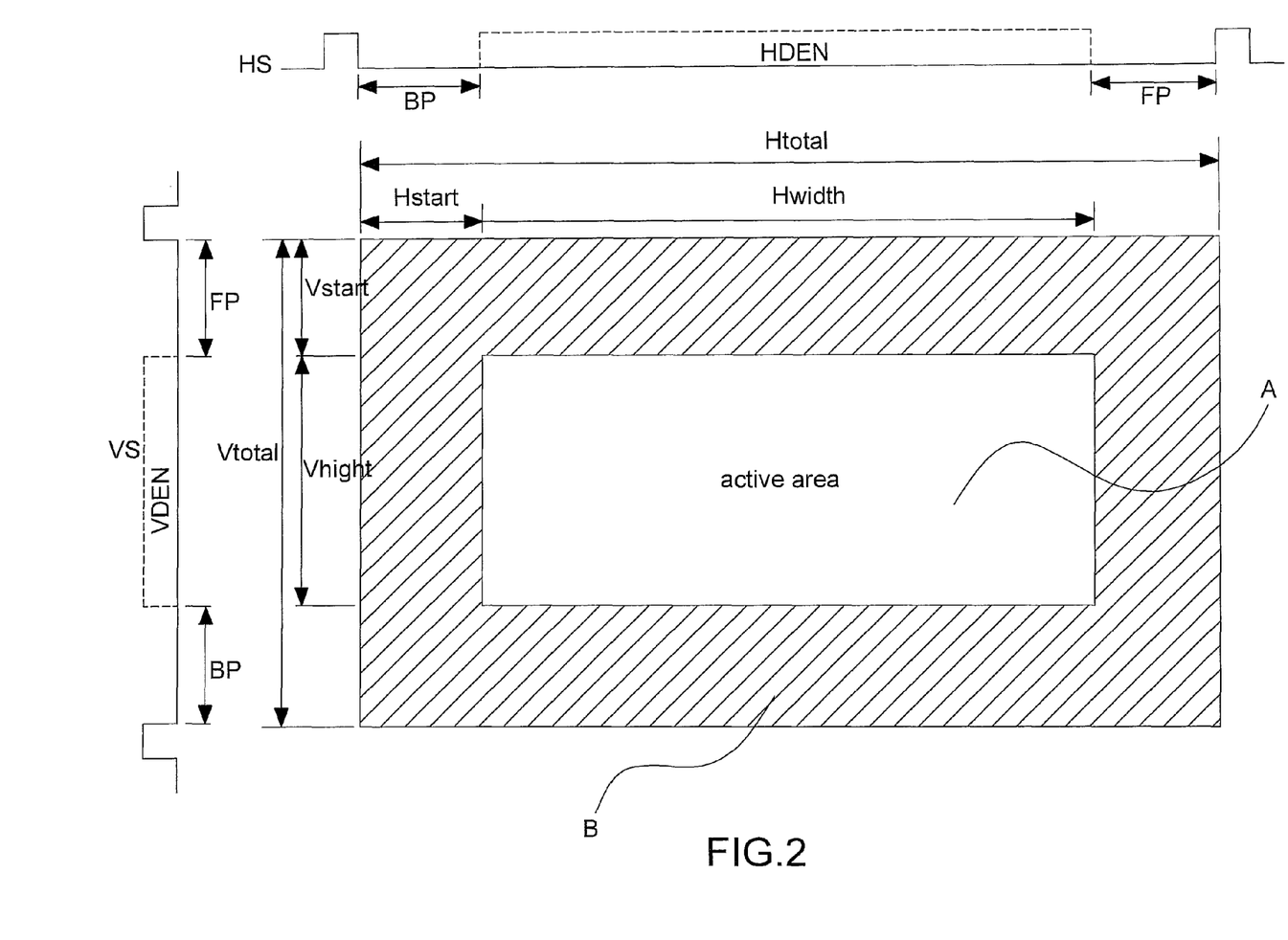
FIG. 2 shows a schematic diagram illustrating the relevant image attribute parameters of the frame of a digital image data.

FIG. 2 shows the image attribute parameters relevant to a frame of a digital image data DA. The frame comprises an active area (A) and a blank (or inactive) area (B). The parameters relevant to a frame comprise a frame width (Htotal), a frame height (Vtotal), a horizontal starting point (Hstart) of the active area, a vertical starting point (Vstart) of the active area, an active area width (Hwidth), and an active area height (Vhight). The horizontal synchronizing signal HS comprises a front porch FP, a horizontal data enabling area $H_{DEN}$, and a back porch BP. The meaning for each of the above-mentioned parameters can be understood by those who are skilled in the art and will not be repeated hereinafter.

Detail description of the operating method of the mode detection circuit 10 according to one embodiment of the invention will be given in the following. It is assumed that the fixed resolution of the flat panel display device is 1280×1024. It is also assumed that the mode built-in to the front end circuit 11 comprises a first mode (640×480), a second mode (800×600), a third mode (1024×768), a fourth mode (1280×1024), a fifth mode (1280×768), and a sixth mode (1366×768). It should be noted that the above-mentioned modes are commonly used modes, but the invention is not limited to the above-mentioned modes.

Figure 3A:
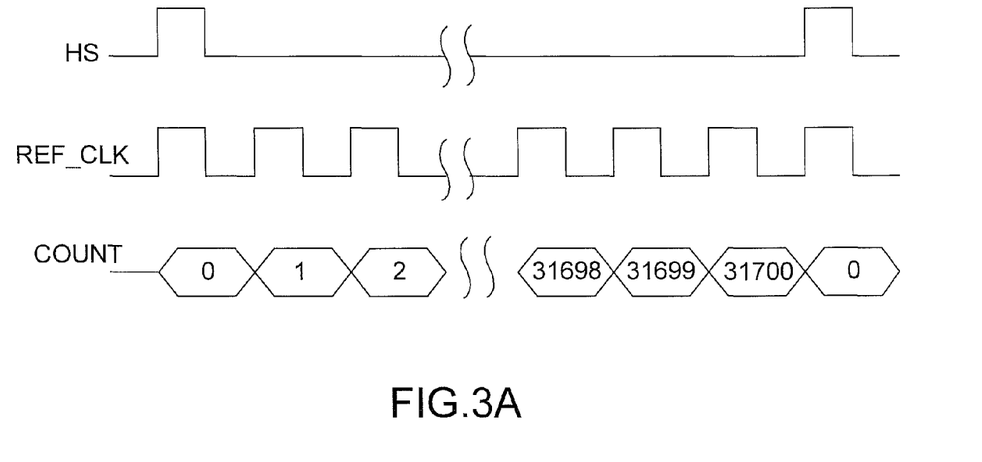
FIG. 3 shows a schematic diagram illustrating the signal timing diagram of the mode detection method according to the first embodiment of the invention.
Figure 3B:
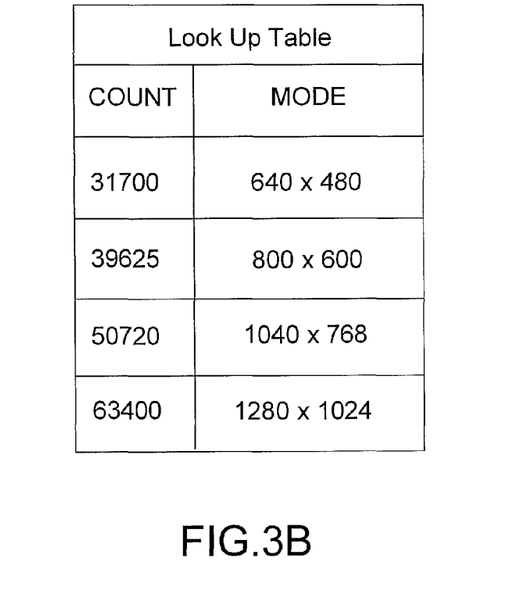

In the first embodiment of the mode detection according to the invention, a clock signal generating unit that outputs a reference clock signal REF_CLK can be designed in the front end circuit 11 (not shown in the figure). When the horizontal synchronizing signal HS is inputted to the front end circuit 11, the counter of the counting unit 114 will receive it and performs counting activity according to the reference clock signal REF_CLK for measuring the signal period of the horizontal synchronizing signal HS. In order to provide more explicit description, please refer to FIG. 3A. It is assumed that in this embodiment of the invention, the inputted image signal is of 640×480 image signal mode, the frequency of the horizontal synchronizing signal HS is 31.5 KHz, and the frequency of the reference clock signal is 100 MHz. When triggered by the rising edge of the horizontal synchronizing signal HS, the counter will start counting according to the reference clock signal REF_CLK. Since the frequency of the horizontal synchronizing signal HS is 31.5 KHz and the frequency of the reference clock signal is 100 MHz, the counting value COUNT of the counter between the horizontal synchronizing signals HS is about 31700. Then, the counting unit 114 outputs the counted counting value COUNT to the look-up-table in the mode decision unit 112 for performing tablelooking-up. Then, please refer to FIG. 3B. Taking the counting value of 31700 as an example, the mode decision unit 112 determines that the inputted image signal should be of the 640×480 image signal mode via the table-looking-up and transmits the detected image signal mode to the determining unit 13 to further determine whether the inputted image signal mode is the 640×480 or not. According to one embodiment of the invention, the determining unit 13 determines whether the image signal mode is the 640×480 or not according to the data amount in the line buffer 121. For example, if the inputted image signal is 640×450 instead of the 640×480, then the determining unit 13 will detect that the data amount in the line buffer 121 is insufficient, that is, the data amount is less than a threshold value and the underflow phenomenon is generated. Under such situation, the determining unit 13 generates a control signal DT and transmits to the mode decision unit 112 for re-selecting a proper mode and setting new resolution. The determining unit 13 performs determination again until there is no underflow or overflow phenomenon for determining the correct image mode.

According to the second embodiment of the mode detection of the invention, the counter of the counting unit 114 can also determine the correct horizontal resolution by way of counting the number of pixel clocks in the enabling signal HDEN. Then the table-looking-up is performed in the look-up-table of the mode decision unit 112 for determining the vertical resolution. For example, the counter of the counting unit 114 counts 640 pixel clocks in the enabling signal HDEN and inputs the counted value 640 to the look-up-table of the mode decision unit 112 to perform table-looking-up. The look-up-table outputs the mode corresponding to the number of 640, such as: the 640×480 image mode, for completing the mode detection of the input image. Furthermore, as described in the first embodiment of the invention, if the input image is of a rare mode, such as: the 640×450, the determining unit 13 detects if there is underflow or overflow phenomenon in the data amount in the line buffer 121 and feeds back to control the mode decision unit 112 for re-selecting the proper mode and setting new resolution.

Figure 4A:
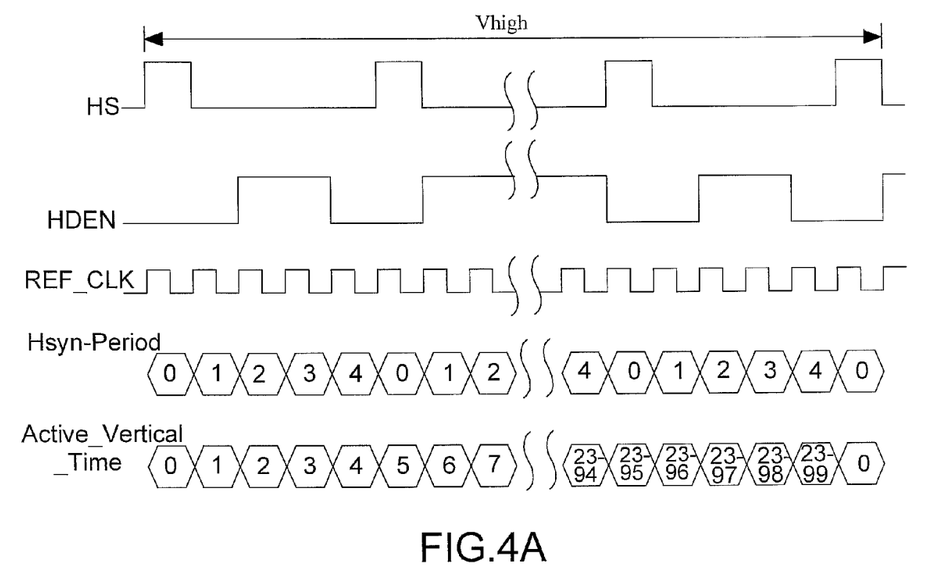
FIG. 4 shows a schematic diagram illustrating the signal timing diagram of the mode detection method according to the third embodiment of the invention.
Figure 4B:
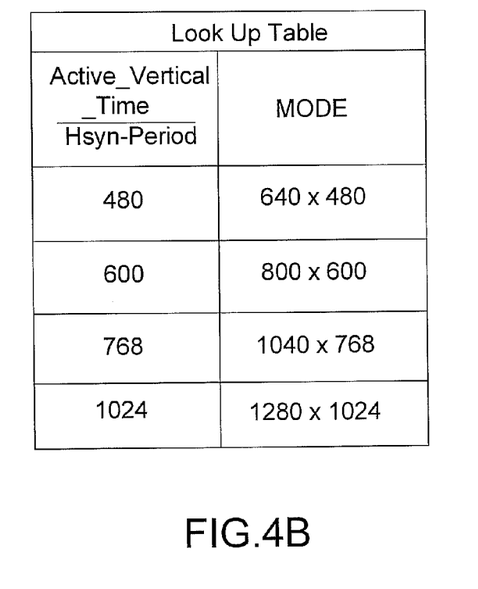

According to the third embodiment of the mode detection of the invention, the mode detection circuit 10 can also determine the vertical resolution firstly and then performs table-looking-up in the look-up-table of the mode decision unit 112 for determining the horizontal resolution. Referring to FIGS. 4A and 4B, a clock signal generating unit can be designed in the front end circuit 11 to output a reference clock signal REF_CLK. Then the first counter of the counting unit 114 performs counting activity of the reference clock signal REF_CLK for measuring the active area time (Active_Vertical_Time, the Vhight time shown in FIG. 2) of the image signal. The second counter of the counting unit 114 performs counting activity of the reference clock signal REF_CLK for measuring the period of the horizontal synchronizing signal (Hsync_Period, the Htotal time shown in FIG. 2). The first counter and the second counter output a first counting value and a second counting value, respectively. Then, the calculating unit 115 divides the two counting values to output a calculating value (the ratio of the Active_Vertical_Time to the Hsync_Period). The mode decision unit 112 determines the vertical resolution of the image signal according to the calculating value. After determining the vertical resolution, such as: 480, the mode decision unit 112 performs table-looking-up in the look-up-table for further determining the image mode of the input image, such as: the 640×480 image mode, to complete the mode detection of the input image. Similarly, if the input image is a rare mode, such as: the 620×480, the determining unit 13 detects if there is underflow or overflow phenomenon in the data amount in the line buffer 121 and feeds back to control the mode decision unit 112 for determining the correct image mode.

Figure 5:
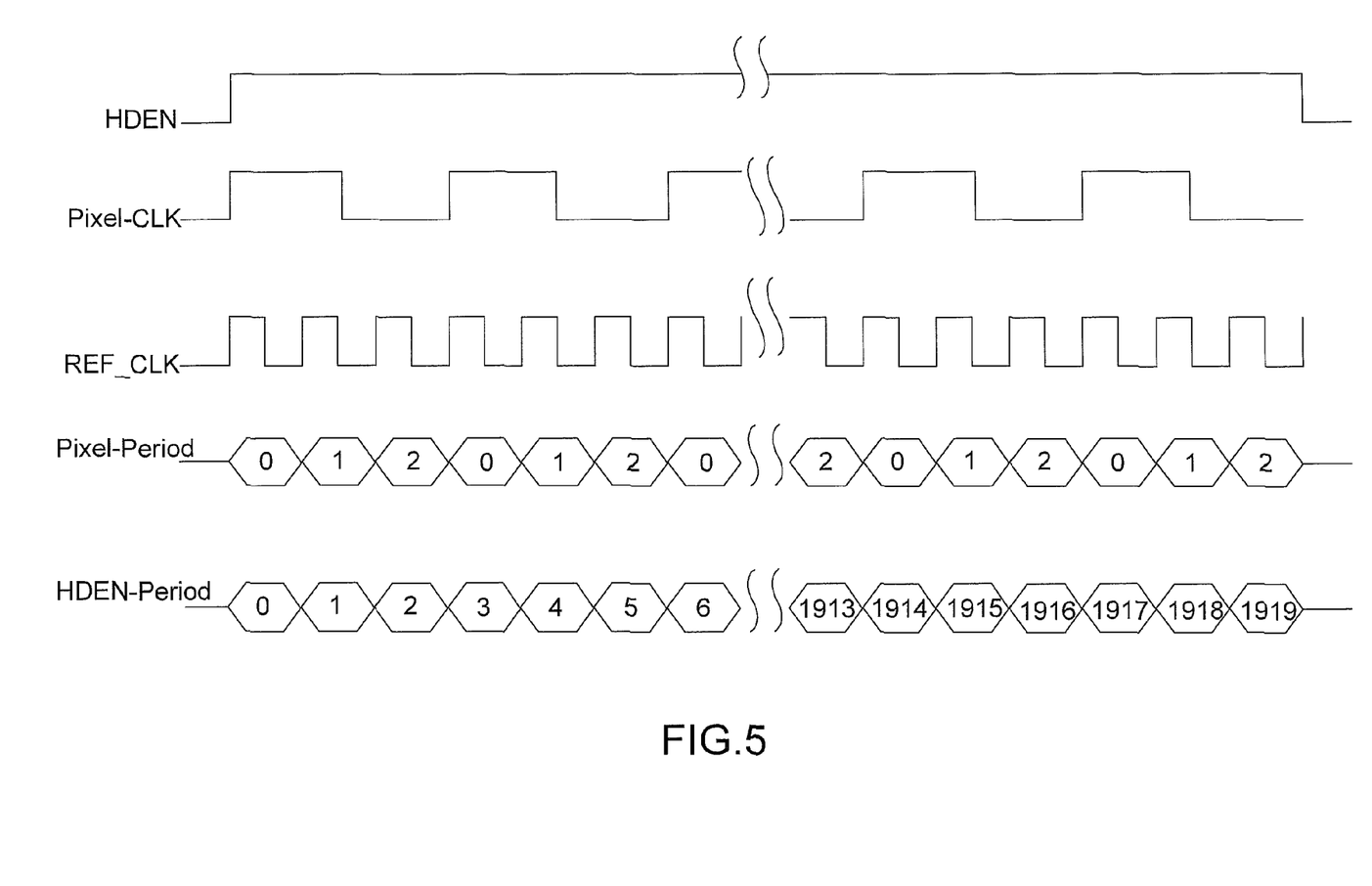
FIG. 5 shows a schematic diagram illustrating the signal timing diagram of the mode detection method according to the fourth embodiment of the invention.

According to the fourth embodiment of the mode detection of the invention, the vertical resolution can be determined by the same method of utilizing Active_Vertical_Time/Hsync_Period in the third embodiment of the invention. The horizontal resolution also can be determined by the same method. Referring to FIG. 5, a clock signal generating unit can be designed in the front end circuit 11 for outputting a reference clock signal REF_CLK. Then, the third counter of the counting unit 114 performs counting activity of the reference clock signal REF_CLK for measuring the enabling time of an enabling signal HDEN. The fourth counter of the counting unit 114 performs counting activity of the reference clock signal REF_CLK for measuring the period Pixel_CLK of the pixel clock. The third counter and the fourth counter output a third counting value and a fourth counting value, respectively. Then, the calculating unit 115 divides the two counting values to output a second calculating value (i.e. the ratio of the HDEN to the Pixel_CLK). Finally, the mode decision unit 112 determines the horizontal resolution of the image signal according to the calculating value.

According to the fifth embodiment of the mode detection of the invention, the horizontal resolution is determined by way of a counter counting the pixel clocks in the enabling signal HDEN to output a first counting value as the horizontal resolution of the image signal. The vertical resolution is determined by way of another counter counting the total count of pixel clocks in the active area to output a second counting value. Then a calculation unit divides the derived total count (the second counting value) by the number of pixel clocks (the first counting value) in the enabling signal HDEN to output a calculating value as the vertical resolution of the image signal. Obviously, after counting the total count of pixel clocks within the height Vhight of the active area, the vertical resolution can also be derived by dividing the obtained total count by the total count of pixel clocks between the horizontal synchronizing signals HS.

Figure 6:
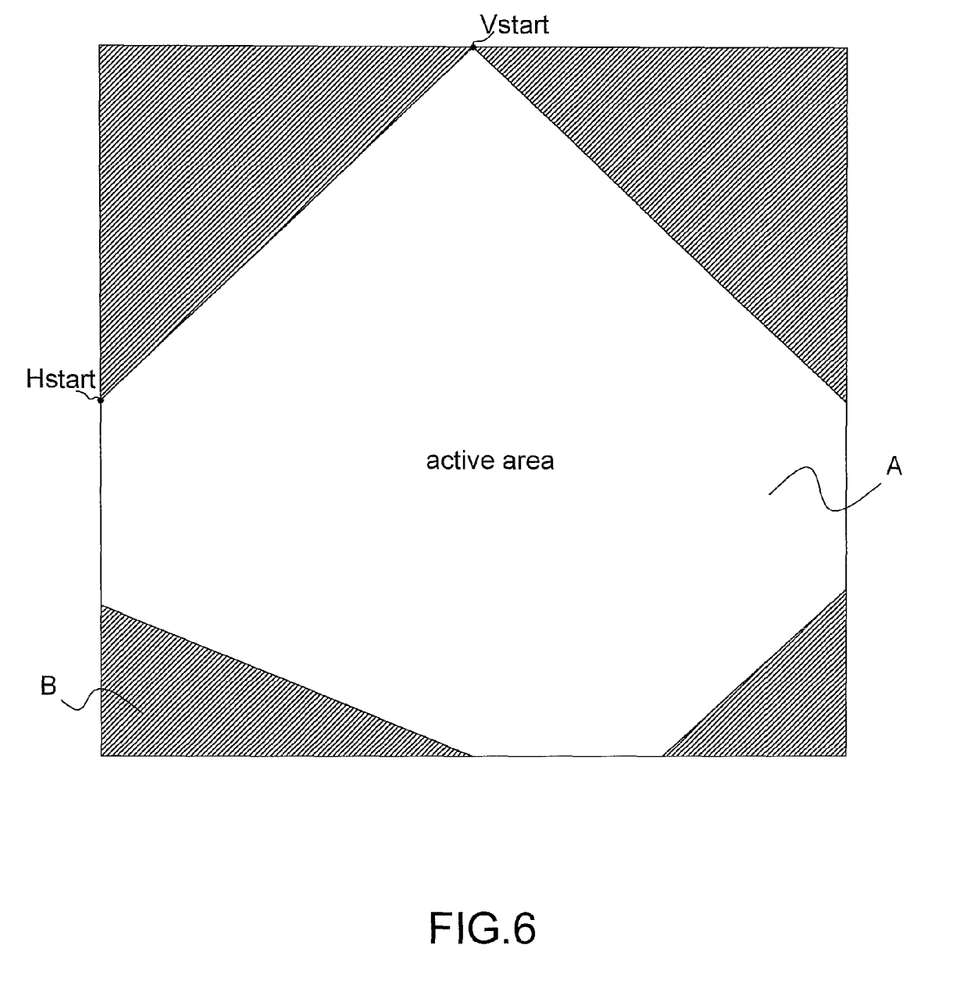
FIG. 6 shows a schematic diagram illustrating the frame of an analog image data.

According to the description up to now, the mode detection circuit 10 has already acquired the mode of the image signal IS. In another embodiment of the invention, in order to receive the image data DA more accurately so that the flat panel display device can display the image more precisely, the front end circuit 11 can measure and process the starting points of the active area of the frame, that is, the horizontal starting point Hstart and the vertical starting point Vstart. For example, when the image signal IS is a digital signal, the measuring unit 111 determines the horizontal starting point Hstart and the vertical starting point Vstart of the active area of the frame of the image data DA according to the data enabling signal HDEN. Then, the data fetching unit 113 receives the starting point of the active area of the frame of the image data DA and fetches the image data DA. If the image signal IS is an analog signal, the measuring unit 111 compares each pixel of the image data DA with a pre-determined value. The starting points of the active area of the frame, that is, the horizontal starting point Hstart and the vertical starting point Vstart are determined according to the comparison result and are provided to the data fetching unit 113 for fetching the image data DA. For example, referring to FIG. 6, the pixel brightness value can be utilized to determine the comparison between the pixel and the pre-determined value in the analog image signal IS. It is assumed that the pixel brightness of the active area A is larger than the pre-determined value 16 and the pixel brightness of the blank area B is less than the pre-determined value 16. During operation, the measuring unit 111 scans every pixel of the frame of the image data DA, one by one from the left to the right and from the top to the bottom, and compares the brightness value of each pixel with the pre-determined value 16. Then, the position of the first pixel scanned that has a brightness value larger than 16 and is closest to the top of the frame, is the vertical starting point Vstart of the active area. The position of the first pixel scanned that has a brightness value larger than 16 and is closest to the left of the frame, is the horizontal starting point Hstart of the active area. The starting point of the active area A of the frame can thus be found by such a method.

Figure 7:
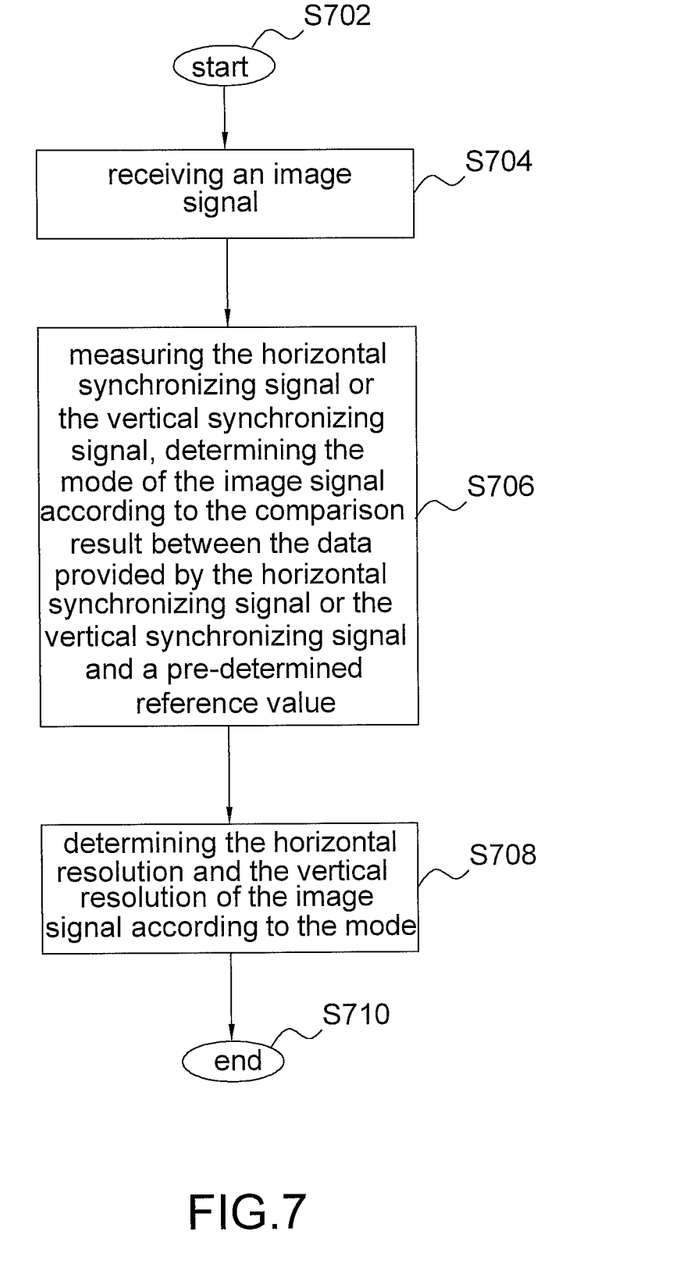
FIG. 7 shows the flow chart of the mode detection method according to one embodiment of the invention.

FIG. 7 shows the flow chart of the mode detection method according to one embodiment of the invention. The method, applicable to a display device, comprises the following steps:

Step S702: start;

Step S704: receiving an image signal, where the image signal comprises a horizontal synchronizing signal, a vertical synchronizing signal, image data, and/or a data enable signal;

Step S706: measuring the horizontal synchronizing signal or the vertical synchronizing signal, determining if the image signal is supported according to the comparison result between the data provided by the horizontal synchronizing signal or the vertical synchronizing signal and a pre-determined reference value, and determining the mode of the image signal where the pre-determined reference value can be provided by a look-up-table or a hardware circuit;

(In one preferred example, the step S706 measures the horizontal synchronizing signal and determines the mode of the image signal according to the comparison result between the data of the horizontal synchronizing signal and a pre-determined reference value. Therefore, the fifth mode (1280× 768) and the sixth mode (1366×768) can be determined easily.)

Step S708: determining the horizontal resolution and the vertical resolution of the image signal according to the mode; and Step S710: end.

Figure 8:
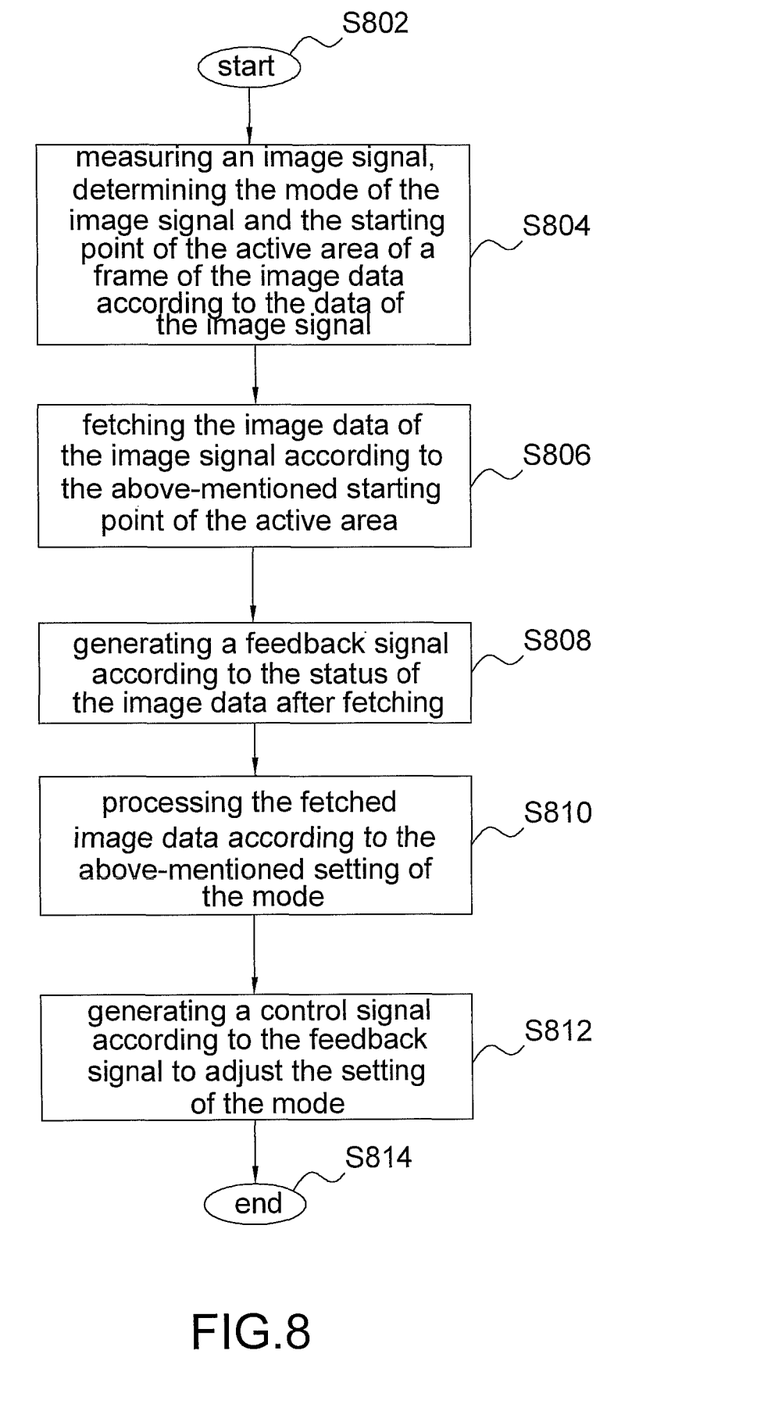
FIG. 8 shows the flow chart of the mode detection method according to another embodiment of the invention.

FIG. 8 shows the flow chart of the mode detection method according to another embodiment of the invention. The method, applicable to a display device, comprises the following steps:

Step S802: start;

Step S804: measuring an image signal, determining the mode of the image signal and the starting point of the active area of a frame of the image data according to the data of the image signal;

Step S806: fetching the image data of the image signal according to the above-mentioned starting point of the active area;

Step S808: generating a feedback signal according to the status of the image data after fetching;

Step S810: the image data processing step for processing the fetched image data according to the above-mentioned setting of the mode;

Step S812: generating a control signal according to the feedback signal to adjust the setting of the mode; and Step S814: end.

In conclusion, the mode detection circuit and the method thereof according to the invention are able to detect the resolution of the image signal automatically when the image signal is inputted.

Although the description of the invention is by way of above-mentioned examples of embodiment, however, it should not be construed as any limitation on the scope of the invention. Various modifications or changes can be performed by those who are skilled in the art without deviating from the scope of the invention.

What is claimed is:

1. A mode detection circuit applicable to a display device, for detecting an image signal including a horizontal resolution and a vertical resolution, the mode detection circuit comprising:

a plurality of modes separately corresponding to a preset resolution;

a measuring unit receiving a clock signal, for counting the clock signal to output a first counting value and a second counting value;

a calculation unit coupled to the measuring unit, for performing a calculation with the first counting value and the second counting value and thereby outputting a calculating value;

a decision unit coupled to the calculation unit, for generating a corresponding virtual horizontal synchronizing signal and a corresponding virtual vertical synchronizing signal according to an image resolution pre-determined by a current mode selected from one of the modes according to the calculating value;

a data fetching unit for fetching an image data according to the virtual horizontal synchronizing signal and the virtual vertical synchronizing signal;

a storing unit, for storing a fetched image data of the image signal from the data fetching unit; and a determining unit, for comparing a data amount of the image data stored in the storing unit with a threshold value to detect if there is underflow or overflow phenomenon in the data amount in the storing unit and determine whether the one mode determined by a look-up-table is correct;

wherein the calculation unit is performing the calculation relative to a ratio of the first counting value to the second counting value to generate the calculating value;

wherein if there is underflow or overflow phenomenon in the data amount in the storing unit, the determining unit generates a control signal to feed back to control the decision unit for re-selecting another mode from the plurality of modes;

wherein the clock signal is a pixel clock and the measuring unit comprises:

a first counter, for counting the number of the pixel clocks during an enabling time of an enabling signal to output the first counting value as the horizontal resolution; and a second counter, for counting a total count of the pixel clocks within an active area of the image signal to output the second counting value;

wherein the calculating unit divides the second counting value by the first counting value to output the calculating value as the vertical resolution.

2. The mode detection circuit according to claim 1, wherein the look-up-table is for indexing the calculating value to determine the horizontal resolution.

3. The mode detection circuit according to claim 1, wherein the decision unit sets a new horizontal resolution when the data amount of the image data is less than the threshold value.

4. A mode detection method for detecting a picture mode of an image signal including a horizontal resolution and a vertical resolution, the mode detection method comprising:

providing a plurality of modes separately corresponding to a preset resolution;

receiving a clock signal;

counting the clock signal to output a first counting value and a second counting value;

performing a calculation with the first counting value and the second counting value and thereby outputting a calculating value;

determining and generating a corresponding virtual horizontal synchronizing signal and a corresponding virtual vertical synchronizing signal according to an image resolution pre-determined by a current mode selected from one of the modes according to the calculating value;

fetching an image data according to the virtual horizontal synchronizing signal and the virtual vertical synchronizing signal;

storing a fetched image data of the image signal into a storing unit; and comparing a data amount of the image data stored in the storing unit with a threshold value to detect if there is underflow or overflow phenomenon in the data amount in the storing unit and determine whether the one mode is correct;

wherein the calculating value is corresponding to a ratio of the first counting value to the second counting value;

wherein if there is underflow or overflow phenomenon in the data amount in the storing unit, a determining unit generates a control signal to feed back to control a decision unit for re-selecting another mode from the plurality of modes;

wherein the clock signal is a pixel clock and the mode detection method further comprises:

counting the number of the pixel clocks during an enabling time of an enabling signal to output the first counting value as the horizontal resolution;

counting a total count of the pixel clocks within an active area of the image signal to output the second counting value; and dividing the second counting value by the first counting value to output the calculating value as the vertical resolution.

5. The mode detection method according to claim 4, further comprising:

indexing the calculating value by a look-up-table and outputting a table-looking-up result to determine the horizontal resolution or the vertical resolution;

wherein the table-looking-up result determines the resolution of one direction when the calculating value is to determine the resolution of the other direction.

6. The mode detection method according to claim 5, wherein when the calculating value is to determine the vertical resolution, the table-looking-up result is to determine the horizontal resolution.

7. The mode detection method according to claim 4, further comprising:

setting a new horizontal resolution when the data amount of the image data is less than the threshold value.

8. The mode detection method according to claim 4, wherein the mode detection method is applied in a flat panel display.

* * * * *